United States Patent
Irino et al.

(10) Patent No.: US 11,809,156 B2
(45) Date of Patent: Nov. 7, 2023

(54) THERMAL DISPLACEMENT CORRECTION METHOD FOR MACHINE TOOL

(71) Applicant: DMG MORI CO., LTD., Nara (JP)

(72) Inventors: Naruhiro Irino, Nara (JP); Koichiro Narimatsu, Nara (JP)

(73) Assignee: DMG MORI CO., LTD., Nara (JP)

( * ) Notice: Subject to any disclaimer, the term of this patent is extended or adjusted under 35 U.S.C. 154(b) by 411 days.

(21) Appl. No.: 17/289,867

(22) PCT Filed: Oct. 8, 2019

(86) PCT No.: PCT/JP2019/039592
§ 371 (c)(1),
(2) Date: Apr. 29, 2021

(87) PCT Pub. No.: WO2020/090373
PCT Pub. Date: May 7, 2020

(65) Prior Publication Data
US 2021/0405608 A1    Dec. 30, 2021

(30) Foreign Application Priority Data

Oct. 31, 2018 (JP) ................................ 2018-205521

(51) Int. Cl.
*G05B 19/404* (2006.01)
*B23Q 15/18* (2006.01)
*G05B 13/02* (2006.01)

(52) U.S. Cl.
CPC ........... *G05B 19/404* (2013.01); *B23Q 15/18* (2013.01); *G05B 13/0265* (2013.01); *G05B 2219/49207* (2013.01)

(58) Field of Classification Search
None
See application file for complete search history.

(56) References Cited

U.S. PATENT DOCUMENTS

2006/0218811 A1* 10/2006 Sato ............... G05B 19/404
                                                         33/702
2017/0017227 A1*  1/2017 Qi ................ G05B 19/404
(Continued)

FOREIGN PATENT DOCUMENTS

JP    H11114776 A    4/1999
JP    2002224935 A   8/2002
(Continued)

OTHER PUBLICATIONS

Extended European Search Report related to Application No. 19879077.6 dated Jun. 23, 2022.
(Continued)

*Primary Examiner* — Ryan A Jarrett
(74) *Attorney, Agent, or Firm* — von Briesen & Roper, s.c.

(57) ABSTRACT

Provided is a thermal displacement correction method using a machine learning method but making it possible to, on a user side, calculate a thermal displacement amount appropriate to a machine tool of the user and correct the thermal displacement. In a machine tool on a target user side, a thermal displacement amount between workpiece and tool corresponding to a temperature at a preset measurement point is calculated based on a parameter defining a relation between the temperature and the thermal displacement amount, and a positioning position for workpiece and tool is corrected in accordance with the calculated thermal displacement amount. On a manufacturer side, operational status information of the machine tool on the target user side is obtained, an operational status identical to the obtained operational status on the target user side is reproduced with a machine tool of a same type as the machine tool on the target user side based on the obtained operational status information, a temperature at a measurement point identical to the measurement point on the machine tool on the target (Continued)

user side and a thermal displacement amount between workpiece and tool are measured during reproduction, and the parameter is calculated by machine learning based on the measured temperature and thermal displacement amount. The parameter in the machine tool on the target user side is updated with the calculated parameter.

8 Claims, 2 Drawing Sheets

(56) References Cited

U.S. PATENT DOCUMENTS

| | | |
|---|---|---|
| 2018/0196405 A1 | 7/2018 | Maekawa |
| 2018/0275629 A1 | 9/2018 | Watanabe |
| 2018/0276570 A1 | 9/2018 | Watanabe |
| 2019/0011898 A1* | 1/2019 | Saeki .................. G05B 13/027 |

FOREIGN PATENT DOCUMENTS

| | | |
|---|---|---|
| JP | 2005018600 A | 1/2005 |
| JP | 2018111145 A | 7/2018 |
| JP | 2018124929 A | 8/2018 |
| JP | 2018138327 A | 9/2018 |
| JP | 2018153902 A | 10/2018 |

OTHER PUBLICATIONS

International Search Report for related Application No. PCT/JP2019/039592; report dated Dec. 17, 2019.

Nagaba, et al., "Deep learning technology from Finland innovates the industrial waste disposal, Shitara Kousan has achieved labor-saving and speed-improvement by a robot equipped with AI", NIKKEI Robotics, Feb. 2017, No. 9, pp. 7-8.

* cited by examiner $A_j = f((\Sigma Hw_{i,j} \cdot t_i) + V_j)$ $D = f((\Sigma Kw_j \cdot A_j) + Kv)$ $f(u) = 1/(1 + exp(-u))$

THERMAL DISPLACEMENT CORRECTION METHOD FOR MACHINE TOOL

TECHNICAL FIELD

The present invention relates to a thermal displacement correction method for correcting displacement (thermal displacement) occurring between a tool and a workpiece due to thermal deformation of structures constituting a machine tool.

BACKGROUND ART

In a machine tool, structures constituting the machine tool are thermally deformed by the ambient temperature in which the machine tool is installed and by heat generated by motion mechanisms of the machine tool operating (e.g., heat generated by a motor and heat generated by a sliding unit), and such thermal deformation causes displacement (thermal displacement) between a tool and a workpiece.

Conventionally, such thermal displacement is dealt with by estimating the amount of thermal displacement and correcting a positioning position for the workpiece and the tool in accordance with the estimated thermal displacement amount. In recent years, the attempt has been made to estimate such a thermal displacement amount by machine learning. A machine learning device for estimating a thermal displacement amount has been disclosed in Patent Literature 1 listed below.

The machine learning device as disclosed in Patent Literature 1 uses machine learning to optimize an equation for estimating a thermal displacement amount of a thermally expanding machine element of a machine tool based on operating state data representing an operating state of the machine element. The machine learning device includes:

data obtaining means for obtaining the operating state data of the machine element;

thermal displacement amount obtaining means for obtaining measured values for the thermal displacement amount of the machine element;

storing means for storing, as training data, the operating state data of the machine element obtained by the data obtaining means and the measured values for the thermal displacement amount of the machine element obtained by the thermal displacement amount obtaining means associated with each other as a label;

equation setting means for setting an equation for calculating the thermal displacement amount of the machine element, by performing machine learning based on the operating state data of the machine element and the measured values for the thermal displacement amount of the machine element;

thermal displacement amount calculating means for calculating an estimated value for the thermal displacement amount of the machine element, by substituting operating state data of the machine element within a predetermined period of time stored as training data in the storing means into the equation set by the equation setting means; and determining means for determining whether a difference between the estimated value for the thermal displacement amount of the machine element within the predetermined period of time calculated by the thermal displacement amount calculating means and a measured value for the thermal displacement amount of the machine element within the predetermined period of time stored as training data in the storing means exceeds a predetermined threshold, and the equation setting means sets the equation again in the case where the determining means determines that the difference exceeds the predetermined threshold, while the equation setting means sets the equation as an optimal equation in the case where the determining means determines that the difference does not exceed the predetermined threshold.

CITATION LIST

Patent Literature

[Patent Literature 1] Japanese Unexamined Patent Application Publication No. 2018-111145

SUMMARY OF INVENTION

Technical Problem

A machine tool installed on a user side is naturally used to machine products, and the user always desires to reduce manufacturing cost. To this end, the user always makes efforts to maximize availability of the machine tool.

On the other hand, in order to obtain with the above-described machine learning device an equation for estimating a thermal displacement amount of a machine element, measured values for the thermal displacement amount of the machine element are required. In order to obtain measured values for the thermal displacement amount, it is required to stop the machine tool and then measure a displacement amount between a tool and a workpiece with an appropriate measurement device. Further, in order to obtain by machine learning an optimal equation for estimating the thermal displacement amount, an enormous amount of data regarding the operating state of the machine element and the thermal displacement amount is needed.

However, as described above, it is actually difficult for the user to measure the thermal displacement amount with the machine tool stopped. Therefore, the above-described conventional machine learning device may be in theory capable of deriving an equation for calculating the thermal displacement amount, but in terms of practicality, it is very difficult to use the machine learning device.

A possible solution to this problem is to, on the manufacturer side, obtain data regarding the operating state of the machine element and the thermal displacement amount with a machine tool of the same type and, based on the obtained data, derive with the above-described machine learning device an equation for calculating the thermal displacement amount. However, the environment in which the machine tool on the manufacturer side is installed is different from the environment in which the machine tool on the user side is installed; therefore, such a solution cannot always derive an equation appropriate to the machine tool installed on the user side.

The present invention has been achieved in view of the above-described circumstances, and an object of the present invention is to provide a thermal displacement correction method which uses a machine learning method but makes it possible to, on a user side, calculate a thermal displacement amount appropriate to a machine tool installed on the user side and correct the thermal displacement.

Solution to Problem

To solve the above-described problems, the present invention provides a method of, in a machine tool installed on a target user side, calculating a thermal displacement amount between a workpiece and a tool corresponding to a temperature at a measurement point previously set on the machine tool, based on a parameter defining a relation between the temperature at the measurement point and the thermal displacement amount, and correcting a positioning position for the workpiece and the tool in accordance with the calculated thermal displacement amount, the method including:

on a manufacturer side, obtaining operational status information of the machine tool installed on the target user side, reproducing an operational status identical to the obtained operational status on the target user side with a machine tool of a same type as the machine tool installed on the target user side based on the obtained operational status information, measuring during reproduction a temperature at a measurement point identical to the measurement point set on the machine tool installed on the target user side and a thermal displacement amount between a workpiece and a tool, and calculating the parameter by machine learning based on the measured temperature and thermal displacement amount; and updating the parameter in the machine tool installed on the target user side with the calculated parameter.

In the present invention, correction of thermal displacement is carried out in a machine tool installed on a target user side. That is to say, a thermal displacement amount between a workpiece and a tool in the machine tool corresponding to a temperature measured at a measurement point previously set on the machine tool is calculated based on a parameter defining a relation between the temperature at the measurement point and the thermal displacement amount, and a positioning position for the workpiece and the tool is corrected in accordance with the calculated thermal displacement amount. In other words, thermal displacement correction is carried out.

The parameter in the machine tool installed on the target user side is updated with the parameter which is set on a manufacturer side. Specifically, on the manufacturer side, operational status information of the machine tool installed on the target user side is obtained, and a machine tool installed on the manufacturer side that is of the same type as the machine tool installed on the target user side is operated based on the obtained operational status information so that an operational status identical to the obtained operational status on the target user side is established. Thereby, the same operating environment as that of the machine tool installed on the target user side is reproduced on the manufacturer side. During this reproduction, a temperature at a measurement point identical to the measurement point set on the machine tool installed on the target user side and a thermal displacement amount between a workpiece and a tool are measured, and the parameter is calculated by machine learning based on the measured temperature and thermal displacement amount. Subsequently, the parameter in the machine tool installed on the target user side is updated with the calculated parameter.

Thus, this thermal displacement correction method is able to obtain a thermal displacement amount between a workpiece and a tool in a machine tool of the same type without stopping the machine tool installed on the user side. Therefore, on the user side, accurate thermal displacement correction is achieved without decrease in availability of the machine tool, so that machining accuracy of the machine tool is improved.

Further, since data regarding the temperature at each measurement point on the machine tool and data regarding the thermal displacement amount between the workpiece and the tool related to the temperature are obtained on the manufacturer side, it is possible to obtain a larger amount of data. By carrying out machine learning with such a large amount of data, the learning effect is improved so that the parameter obtained by the machine learning is of higher accuracy.

Note that it is preferred that the operational status information includes at least information on loads of a spindle motor and a feed motor and information on an ambient temperature in which the machine tool on the target user side is installed. These elements cause thermal deformation of structures of the machine tool. Therefore, by operating the machine tool installed on the manufacturer side such that the same status is established with respect to information on these elements, an operating environment identical to the operating environment of the machine tool installed on the target user side is reproduced on the manufacturer side.

Further, in the present invention, the method may be configured such that, on the manufacturer side, operational status information of a machine tool of the same type possessed by another user is obtained in addition to the operational status information of the machine tool installed on the target user side, an operational status identical to the obtained operational status on the another user side is reproduced with a machine tool of the same type based on the obtained operational status information, a temperature at the measurement point and a thermal displacement amount between a workpiece and a tool are measured during reproduction, and the parameter is calculated by machine learning based on the measured temperature and thermal displacement amount in the operational status on the another user side and the temperature and thermal displacement amount in the operational status on the target user side, and the parameter in the machine tool installed on the target user side is updated with the calculated parameter. This configuration enables a larger amount of temperature data and thermal displacement amount data to be obtained, so that the parameter which is of higher accuracy is calculated.

Further, in the present invention, the method may be configured such that, on the manufacturer side, a temperature at the measurement point and a thermal displacement amount between a workpiece and a tool obtained by uniquely operating a machine tool of the same type on the manufacturer side are also measured, and the parameter is calculated by machine learning based on the measured temperature and thermal displacement amount in the unique operational status on the manufacturer side and the temperature and thermal displacement amount in the operational status on the user side, and the parameter in the machine tool installed on the target user side is updated with the calculated parameter. This configuration enables an even larger amount of temperature data and thermal displacement amount data to be obtained, so that the parameter which is of even higher accuracy is calculated.

Advantageous Effects of Invention

As described above, the method according to the present invention is able to obtain a thermal displacement amount between a workpiece and a tool in a machine tool of the same type without stopping the machine tool installed on the user side. Therefore, on the user side, accurate thermal displacement correction is achieved without decrease in availability of the machine tool, so that machining accuracy of the machine tool is improved.

Further, since data on the temperature at each measurement point on the machine tool and data on the thermal displacement amount between the workpiece and the tool related to the temperature are obtained on the manufacturer side, it is possible to obtain a larger amount of data. By carrying out machine learning with such a large amount of data, the learning effect is improved so that the parameter obtained by the machine learning is of higher accuracy.

DESCRIPTION OF EMBODIMENTS

Hereinafter, a specific embodiment of the thermal displacement correction method according to the present invention will be described with reference to the drawings.

In this embodiment, in a machine tool installed on a target user side, the amount of thermal displacement occurring between a workpiece and a tool in correspondence to a temperature at a measurement point previously set on the machine tool is calculated based on parameters defining a relation between the temperature at the measurement point and the thermal displacement amount, and a positioning position for the workpiece and the tool is corrected in accordance with the calculated thermal displacement amount, that is to say, so that the thermal displacement is eliminated. The parameters are set on the manufacturer side, and the parameters on the target user side are updated with the set parameters. This method is described in detail below.

1. Common Machine Tool

Figure 1:
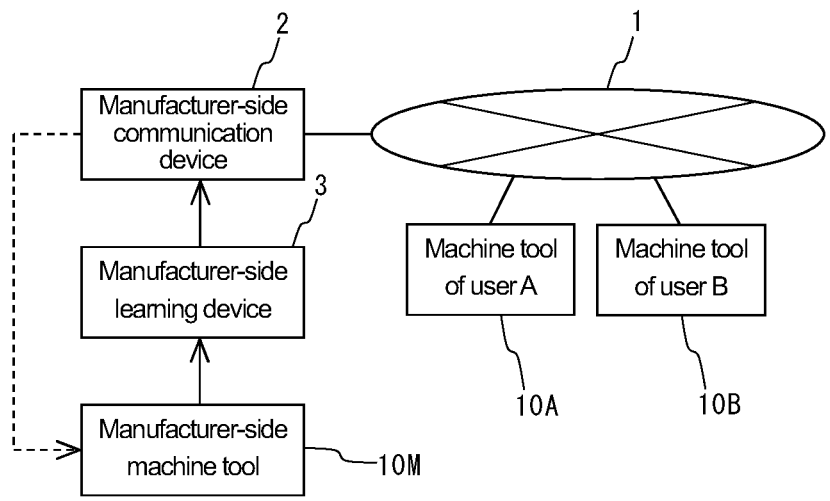
FIG. 1 is a diagram used in describing a thermal displacement correction method according to an embodiment of the present invention.
Figure 2:
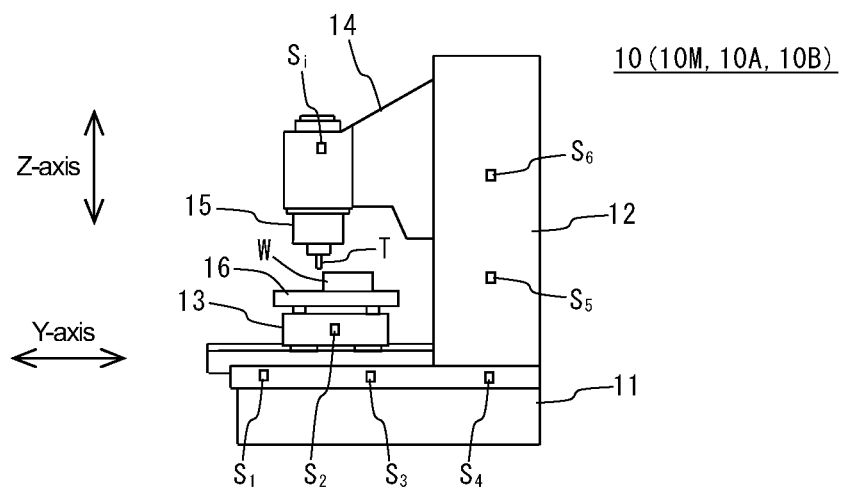
FIG. 2 is a side view of a machine tool in the embodiment.

FIG. 2 illustrates an example of a common machine tool used in this embodiment, i.e., a manufacturer-side machine tool 10M, a machine tool 10A of a user A, and a machine tool 10B of a user B that are shown in FIG. 1. As illustrated in FIG. 2, the machine tool 10 is a vertical machining center that includes a bed 11, a column 12 disposed on the bed 11, a saddle 13 disposed on the bed 11 to be movable in a Y-axis direction indicated by an arrow in the figure, a spindle head 14 disposed on the column 12 to be movable in a Z-axis direction indicated by an arrow in the figure, a table 16 disposed on the saddle 13 to be movable in an X-axis direction orthogonal to both the Y-axis and Z-axis directions, and a spindle 15 held by the spindle head 14 to be rotatable about an axis of rotation parallel to the Z-axis direction.

Note that a vertical machining center is given as an example of the machine tool 10 in this embodiment; however, of course, the machine tool 10 to which the present invention is applicable is not limited to such a vertical machining center.

In the machine tool 10, the spindle 15 and the table 16 are movable relative to each other in the three orthogonal directions, i.e., the X-axis, Y-axis, and Z-axis directions. Such relative movement of the spindle 15 and the table 16 causes a workpiece W arranged on the table 16 to be machined by a tool T attached to the spindle 15.

The machine tool 10 further includes temperature sensors $S_1$ to $S_i$ provided at predetermined positions (measurement points). The temperature sensors $S_1$ to $S_i$ respectively measure temperatures ($t_1$ to $t_i$) at the measurement points. Note that i is a natural number selected from 1 to n.

2. Correction of Thermal Displacement on Target User Side

The target user in this example is the user A shown in FIG. 1; however, the user B also can be a target user. In the machine tool 10A of the user A, a thermal displacement amount $D_X$ in the X-axis direction is calculated, for example, by Equation 1 below.

$$D_X=1/(1+\exp(-((\Sigma A_{Xj} \cdot K_{WXj})+K_{VX}))$$

$$A_{Xj}=1/(1+\exp(-((\Sigma H_{WXi,j} \cdot t_i)+V_{Xj}))) \quad \text{(Equation 1)}$$

Further, a thermal displacement amount $D_Y$ in the Y-axis direction is calculated by Equation 2 below.

$$D_Y=1/(1+\exp(-((\Sigma A_{Yj} \cdot K_{WYj})+K_{VY}))$$

$$A_{Yj}=1/(1+\exp(-((\Sigma H_{WYi,j} \cdot t_i)+V_{Yj}))) \quad \text{(Equation 2)}$$

Further, a thermal displacement amount $D_Z$ in the Z-axis direction is calculated by Equation 3 below.

$$D_Z=1/(1+\exp(-((\Sigma A_{Zj} \cdot K_{WZj})+K_{VZ}))$$

$$A_{Zj}=1/(1+\exp(-((\Sigma H_{WZi,j} \cdot t_i)+V_{Zj}))) \quad \text{(Equation 3)}$$

In Equations 1 to 3 above, i is a natural number selected from 1 to n, and j is a natural number selected from 1 to m. Further, $A_{Xj}$, $A_{Yj}$, $A_{Zj}$, $K_{WXj}$, $K_{WYj}$, $K_{WZj}$, $K_{VX}$, $K_{VY}$, $K_{VZ}$, $H_{WXi,j}$, $H_{WYi,j}$, $H_{WZi,j}$, $V_{Xj}$, $V_{Yj}$, and $V_{Zj}$ are parameters to be set and are updated with parameters calculated on the manufacturer side.

A correction amount $C_X$ for the thermal displacement amount $D_X$ in the X-axis direction, a correction amount $C_Y$ for the thermal displacement amount $D_Y$ in the Y-axis direction, and a correction amount $C_Z$ for the thermal displacement amount $D_Z$ in the Z-axis direction can be represented as shown in Equation 4 below.

$$C_X=-D_X$$

$$C_Y=-D_Y$$

$$C_Z=-D_Z \quad \text{(Equation 4)}$$

In the machine tool 10A of the user A, the thermal displacement amounts $D_X$, $D_Y$, and $D_Z$ are calculated based on the temperatures $t_1$ to $t_i$ measured by the temperature sensors $S_1$ to $S_i$ and Equations 1 to 3 above, and the correction amounts $C_X$, $C_Y$, and $C_Z$ for the thermal displacement amounts $D_X$, $D_Y$, and $D_Z$ are calculated based on Equation 4 above. When a machining operation is performed, a relative positioning position for the workpiece W and the tool T is corrected with the calculated correction amounts $C_X$, $C_Y$, and $C_Z$. Note that the calculation of the correction amounts $C_X$, $C_Y$, and $C_Z$ is usually carried out at intervals of a predetermined period of time.

3. Setting of Parameters on Manufacturer Side

On the manufacturer side, a manufacturer-side communication device 2 that is connected to a telecommunication network 1 obtains operational status information of the machine tool 10A of the user A and operational status information of the machine tool 10B of the user B from the machine tool 10A and the machine tool 10B that are also connected to the telecommunication network 1.

The operational status information of each machine tool 10A, 10B includes at least load information indicative of loads of a spindle motor and a feed motor of the machine tool, ambient temperature information indicative of the ambient temperature in which the machine tool is installed, and temperature information ($t_i$) indicative of the temperature measured by the temperature sensor $S_i$ of the machine tool. The operational status information may additionally include information on ON/OFF of a coolant pump and information on the temperature of a hydraulic fluid. These pieces of information are acquired for a predetermined period of time at predetermined sampling intervals in each machine tool 10A, 10B, and each set of data acquired is transmitted to the manufacturer-side communication device 2 through the telecommunication network 1. Note that the telecommunication network 1 typically can be an Internet network or a public telephone network.

On the manufacturer side, the operational status of the manufacturer-side machine tool 10M that is installed in a temperature-controlled room is adjusted based on the obtained operational status information so as to become identical to the obtained operational status. In other words, the obtained operational status is reproduced with the manufacturer-side machine tool 10M. For example, based on a set of data, the temperature of the temperature-controlled room is adjusted such that the temperature of the temperature-controlled room along time axis coincides with the obtained ambient temperature, and a spindle motor, a feed motor, etc. of the machine tool 10M are driven such that the operational status of the machine tool 10M along time axis coincides with the obtained operational status. Further, in the case where the obtained operational status information includes the coolant pump information and the hydraulic fluid temperature information, a coolant pump of the machine tool 10M is driven and the temperature of a hydraulic fluid of the machine tool 10M is adjusted such that they coincide with the obtained information.

During the obtained operational status being reproduced with the manufacturer-side machine tool 10M, the temperatures $t_1$ to $t_i$, which are measured by the temperature sensors $S_1$ to $S_i$ in the machine tool 10M, are measured at predetermined sampling intervals, and simultaneously a displacement amount (thermal displacement amount) $d_k$ between the tool T and the workpiece W is measured with an appropriate displacement meter (e.g., a touch sensor). The thermal displacement amount $d_k$ is measured as a thermal displacement amount $d_{Xk}$ in the X-axis direction, a thermal displacement amount $d_{Yk}$ in the Y-axis direction, and a thermal displacement amount $d_{Zk}$ in the Z-axis direction. Note that k is a natural number selected from 1 to p.

Note that whether the operational status has been accurately reproduced can be confirmed by comparing the temperatures $t_1$ to $t_i$ measured in the manufacturer-side machine tool 10M with the obtained measured temperatures $t_1$ to $t_i$.

Thus, based on each obtained set of operational status information, the operational status of the manufacturer-side machine tool 10M is adjusted so as to become identical to the obtained operational status, during which the temperatures $t_1$ to $t_i$ measured by the temperature sensors $S_1$ to $S_i$ in the machine tool 10M are obtained at predetermined sampling intervals and simultaneously the thermal displacement amounts $d_{Xk}$, $d_{Yk}$, and $d_{Zk}$ between the tool T and the workpiece W are measured.

Based on data regarding the obtained temperatures $t_1$ to $t_i$ and measured thermal displacement amounts $d_{Xk}$, $d_{Yk}$, and $d_{Zk}$, the parameters $A_{Xj}$, $A_{Yj}$, $A_{Zj}$, $K_{WXj}$, $K_{WYj}$, $K_{WZj}$, $K_{VX}$, $K_{VY}$, $K_{VZ}$, $H_{WXi,j}$, $H_{WYi,j}$, $H_{WZi,j}$, $V_{Xj}$, $V_{Yj}$, and $V_{Zj}$ for estimating (calculating) the thermal displacement amounts $D_{Xk}$, $D_{Yk}$, and $D_{Zk}$ based on the temperatures $t_1$ to $t_i$ measured by the temperature sensors $S_1$ to $S_i$ are set by machine learning in a manufacturer-side learning device 3.

Figure 3:
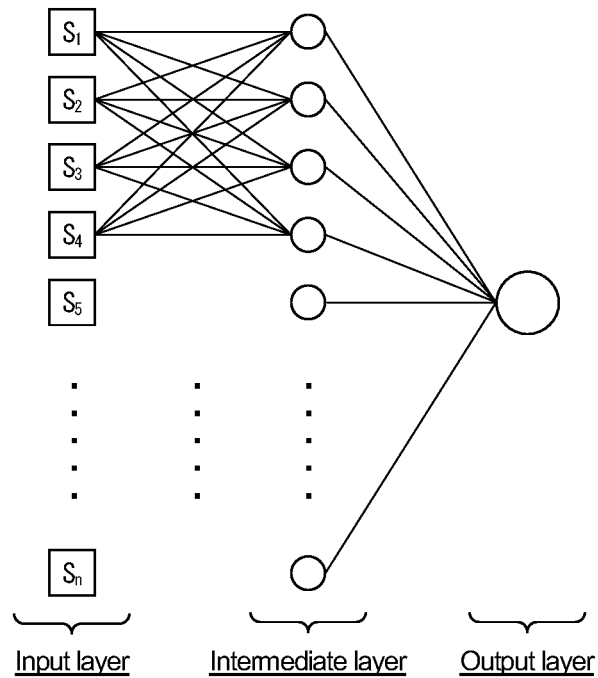
FIG. 3 is a diagram used in describing a concept of machine learning in the embodiment.
Figure 4:
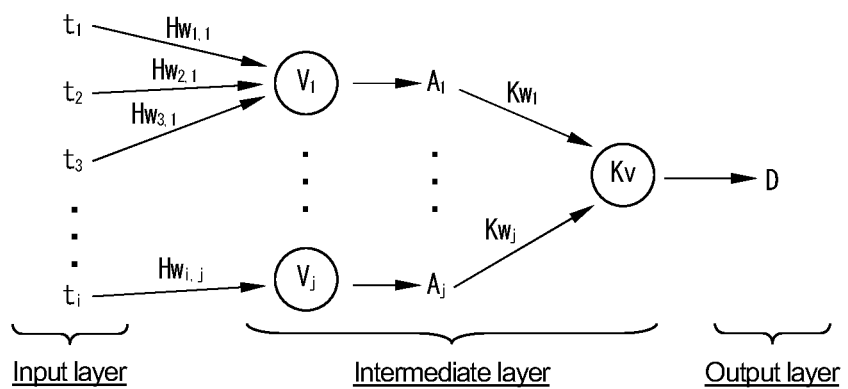
FIG. 4 is a diagram used in describing the concept of machine learning in the embodiment.

A typical neural network model for the machine learning is illustrated in FIG. 3, and an arithmetic algorithm in this neural network model is illustrated in FIG. 4. In this embodiment, the parameters are calculated by backpropagation-based supervised machine learning using a neural network as illustrated FIG. 3 that is applied for data mining.

In the algorithm illustrated in FIG. 4, $t_1$ to $t_i$ in the input layer respectively correspond to output values of the temperature sensors $S_1$ to $S_i$. Further, $H_{Wi,j}$ and $K_{Wj}$ are weighting factors, and $V_j$ and $K_V$ are thresholds as reaction sensitivity. Further, output $A_j$ in the intermediate layer is calculated by Equation 5 below.

$$A_j = f((\Sigma H_{Wi,j} \cdot t_i) + V_j) \qquad \text{(Equation 5)}$$

Further, output D in the output layer is calculated by Equation 6 below.

$$d = D = f((\Sigma K_{Wj} \cdot A_j) + K_V) \qquad \text{(Equation 6)}$$

Note that the outputs Ai and D are transformed by a sigmoid function represented by Equation 7 below.

$$f(u) = 1/(1 + \exp(-u)) \qquad \text{(Equation 7)}$$

Based on data regarding the temperatures $t_1$ to $t_i$ and thermal displacement amounts $d_{Xk}$, $d_{Yk}$, and $d_{Zk}$ obtained as described above and the above-described algorithm, after appropriately setting the number of intermediate layer neurons and the number of intermediate layers, the parameters $A_{Xj}$, $K_{WXj}$, $K_{VX}$, $H_{WXi,j}$, and $V_{Xj}$ for the thermal displacement amount $D_X$ in the X-axis direction, the parameters $A_{Yj}$, $K_{WYj}$, $K_{VY}$, $H_{WYi,j}$, and $V_{Yj}$ for the thermal displacement amount $D_Y$ in the Y-axis direction, and the parameters $A_{Zj}$, $K_{WZj}$, $K_{VZ}$, $H_{WZi,j}$, and $V_{Zj}$ for the thermal displacement amount $D_Z$ in the Z-axis direction are calculated by the above-described backpropagation-based supervised machine learning. Note that the number of intermediate layer neurons j is freely selected; generally, a larger number of intermediate layer neurons j leads to higher accuracy.

The backpropagation-based supervised machine learning in this embodiment is such that: output values of the temperature sensors $S_1$ to $S_i$ that are previously obtained are each input as an input value $t_i$ for the algorithm illustrated in FIG. 4; an output value (D ($D_X$, $D_Y$, $D_Z$)) obtained by appropriately setting the weighting factors $H_{Wi,j}$ and $K_{Wj}$ and the thresholds $V_j$, and $K_V$ is compared with the true value (thermal displacement amount=$d_k$ ($d_{Xk}$, $d_{Yk}$, $d_{Zk}$)); and the operation of changing the weighting factors $H_{Wi,j}$ and $K_{Wj}$ and the thresholds $V_j$ and $K_V$ is repeatedly carried out so that the difference between the obtained output value and the true value is reduced, that is to say, so that the obtained output value and the true value converge, whereby optimal values are set for the weighting factors $H_{Wi,j}$ and $K_{Wj}$ and thresholds $V_j$ and $K_V$ as parameters.

Further, the manufacturer-side learning device 3 accumulates data regarding the temperature $t_i$ and thermal displacement amount $d_k$ obtained by reproducing the operational status obtained from each user with the manufacturer-side machine tool 10M based on the operational status obtained from each user, and calculates the parameters $A_{Xj}$, $A_{Yj}$, $A_{Zj}$, $K_{WXj}$, $K_{WYj}$, $K_{WZj}$, $K_{VX}$, $K_{VY}$, $K_{VZ}$, $H_{WXi,j}$, $H_{WYi,j}$, $H_{WZi,j}$, $V_{Xj}$, $V_{Yj}$, and $V_{Zj}$ by the machine learning on a regular basis or on an as-needed basis based on the accumulated data. The calculated parameters $A_{Xj}$, $A_{Yj}$, $A_{Zj}$, $K_{WXj}$, $K_{WYj}$, $K_{WZj}$, $K_{VX}$, $K_{VY}$, $K_{VZ}$, $H_{WXi,j}$, $H_{WYi,j}$, $H_{WZi,j}$, $V_{Xj}$, $V_{Yj}$, and $V_{Zj}$ are transmitted to the machine tool 10A of the user A via the manufacturer-side communication device 2, and the corresponding parameters stored in the machine tool 10A are updated with the transmitted parameters.

Thus, in the machine tool 10A of the user A, the above-described correction of thermal displacement based on Equations 1 to 4 is carried out based on the updated parameters.

As described above, in the thermal displacement correction method according to this embodiment, the operational status information of the machine tool 10A of the user A and the operational status information of the machine tool 10B of the user B are each transmitted to the manufacturer side, and the operational status of each machine tool 10A, 10B is reproduced with the manufacturer-side machine tool 10M based on the transmitted operational status information. During the reproduction, the temperatures $t_1$ to $t_i$ at the measurement points in the machine tool 10M are measured by the temperature sensors $S_1$ to $S_i$ and the thermal displacement amounts $d_{Xk}$, $d_{Yk}$, and $d_{Zk}$ between the workpiece W and the tool T are measured. Based on the measured temperatures $t_1$ to $t_i$ and thermal displacement amounts $d_{Xk}$, $d_{Yk}$, and $d_{Zk}$, the parameters for estimating (calculating) the thermal displacement amounts $D_{Xk}$, $D_{Yk}$, and $D_{Zk}$ based on the temperatures $t_1$ to $t_i$ are calculated.

Thus, with the thermal displacement correction method according to this embodiment, the parameters for estimating the thermal displacement amounts $D_{Xk}$, $D_{Yk}$, and $D_{Zk}$ that are expected to occur in the machine tool 10A of the user A as thermal displacement correction target are calculated without stopping the machine tool 10A. Therefore, on the user A side, accurate thermal displacement correction is achieved without decrease in availability of the machine tool 10A, so that machining accuracy of the machine tool 10A is improved.

Further, since the temperature data $t_1$ to $t_i$ at the measurement points in the machine tool 10M and the thermal displacement amounts $d_{Xk}$, $d_{Yk}$, and $d_{Zk}$ occurring between the workpiece W and the tool T in relation to the temperatures $t_1$ to $t_i$ are obtained on the manufacturer side, it is possible to obtain a larger amount of data than in the case where such data is obtained on the user A side, because the manufacturer does not need to consider production availability of the machine tool 10M. By carrying out the machine learning with such a large amount of data, the learning effect is more improved so that the parameters obtained by the machine learning are of higher accuracy.

Further, in this embodiment, the parameters are calculated based on not only the operational status information of the machine tool 10A of the user A as target user but also the operational status information of the machine tool 10B of the user B. Therefore, widely usable parameters are set which are not limited to the user A as target user.

Hereinbefore, a specific embodiment of the present invention has been described. However, it should be understood that the present invention is not limited to the above-described embodiment and may be implemented in other manners.

For example, the above-described embodiment is configured such that the calculation of the parameters on the manufacturer side is carried out with the operational status information of the machine tool 10A of the user A and the operational status information of the machine tool 10B of the user B. However, the present invention is not limited to this configuration and the calculation of the parameters may be carried out with only the operational status information of the machine tool 10A of the user A. This configuration enables the parameters which at least correspond to the operating environment of the machine tool 10A to be obtained, so that thermal displacement correction appropriate to the operating environment of the machine tool 10A is carried out in the machine tool 10A.

Alternatively, the calculation of the parameters may be carried out with, in addition to the operational status information from the user A and the user B, operational status information of a machine tool of another user. Alternatively, the parameters may be calculated by the machine learning additionally using data regarding the temperatures $t_1$ to $t_i$ and thermal displacement amounts $d_{Xk}$, $d_{Yk}$, and $d_{Zk}$ between the workpiece W and the tool T which are measured in uniquely operating the machine tool 10M on the manufacturer side. Each of these configurations enables the machine learning to be carried out with data regarding the temperatures $t_1$ to $t_i$ and thermal displacement amounts $d_{Xk}$, $d_{Yk}$, and $d_{Zk}$ between the workpiece W and the tool T obtained from more machine tools 10 which are of the same type but in different operating environments. Such machine learning provides even more improved learning effect so that the parameters obtained are of even higher accuracy, and simultaneously enables calculation of more widely usable parameters which are not limited to the machine tool 10A of the user A as target user. Therefore, thermal displacement correction in the machine tool 10B of the user B and in machine tools 10 of other users can be carried out with the same parameters.

Further, the machine learning is not limited to the above-described method and all other known machine learning methods are applicable in the present invention. Similarly, the equations for estimating the thermal displacement amounts as well as the parameters included in the equations are not limited to the above-escribed ones. Any other suitable equations and parameters may be used. Further, the parameters per se are not limited to ones relevant to the equations.

As already mentioned above, the foregoing description of the embodiments is not limitative, but illustrative in all aspects. One skilled in the art would be able to make variations and modifications as appropriate. The scope of the present invention is not defined by the above-described embodiments, but is defined by the appended claims. Further, the scope of the present invention encompasses all modifications made within the scope equivalent to the scope of the claims.

REFERENCE SIGNS LIST

1 Network
2 Manufacturer-side communication device
3 Manufacturer-side learning device
10, 10M, 10A, 10B Machine tool
11 Bed
12 Column
13 Saddle
14 Spindle head
15 Spindle
16 Table
T Tool
W Workpiece
$S_1$ to $S_i$ Temperature sensor

The invention claimed is:

1. A method of, in a machine tool installed on a target user side, calculating a thermal displacement amount between a workpiece and a tool corresponding to a temperature at a measurement point previously set on the machine tool, based on a parameter defining a relation between the temperature at the measurement point and the thermal displacement amount, and correcting a positioning position for the workpiece and the tool in accordance with the calculated thermal displacement amount, the method comprising:

on a manufacturer side, obtaining operational status information of the machine tool installed on the target user side, reproducing an operational status identical to the obtained operational status on the target user side with a machine tool of a same type as the machine tool installed on the target user side based on the obtained operational status information, measuring during reproduction a temperature at a measurement point identical to the measurement point set on the machine tool installed on the target user side and a thermal displacement amount between a workpiece and a tool, and calculating the parameter by machine learning based on the measured temperature and thermal displacement amount; and updating the parameter in the machine tool installed on the target user side with the calculated parameter.

2. The method of claim 1, wherein the operational status information includes at least information on loads of a spindle motor and a feed motor and information on an ambient temperature in which the machine tool on the target user side is installed.

3. The method of claim 2, wherein:

on the manufacturer side, operational status information of a machine tool of the same type possessed by another user is also obtained, an operational status identical to the obtained operational status on the another user side is reproduced with a machine tool of the same type based on the obtained operational status information, a temperature at the measurement point and a thermal displacement amount between a workpiece and a tool are measured during reproduction, and the parameter is calculated by machine learning based on the measured temperature and thermal displacement amount in the operational status on the another user side and the temperature and thermal displacement amount in the operational status on the target user side; and the parameter in the machine tool installed on the target user side is updated with the calculated parameter.

4. The method of claim 3, wherein:

on the manufacturer side, a temperature at the measurement point and a thermal displacement amount between a workpiece and a tool obtained in uniquely operating a machine tool of the same type on the manufacturer side are also measured, and the parameter is calculated by machine learning based on the measured temperature and thermal displacement amount in the unique operational status on the manufacturer side and the temperatures and thermal displacement amounts in the operational statuses on the target user side and another user side; and the parameter in the machine tool installed on the target user side is updated with the calculated parameter.

5. The method of claim 2, wherein:

on the manufacturer side, a temperature at the measurement point and a thermal displacement amount between a workpiece and a tool obtained in uniquely operating a machine tool of the same type on the manufacturer side are also measured, and the parameter is calculated by machine learning based on the measured temperature and thermal displacement amount in the unique operational status on the manufacturer side and the temperature and thermal displacement amount in the operational status on the user side; and the parameter in the machine tool installed on the target user side is updated with the calculated parameter.

6. The method of claim 1, wherein:

on the manufacturer side, operational status information of a machine tool of the same type possessed by another user is also obtained, an operational status identical to the obtained operational status on the another user side is reproduced with a machine tool of the same type based on the obtained operational status information, a temperature at the measurement point and a thermal displacement amount between a workpiece and a tool are measured during reproduction, and the parameter is calculated by machine learning based on the measured temperature and thermal displacement amount in the operational status on the another user side and the temperature and thermal displacement amount in the operational status on the target user side; and the parameter in the machine tool installed on the target user side is updated with the calculated parameter.

7. The method of claim 6, wherein:

on the manufacturer side, a temperature at the measurement point and a thermal displacement amount between a workpiece and a tool obtained in uniquely operating a machine tool of the same type on the manufacturer side are also measured, and the parameter is calculated by machine learning based on the measured temperature and thermal displacement amount in the unique operational status on the manufacturer side and the temperatures and thermal displacement amounts in the operational statuses on the target user side and another user side; and the parameter in the machine tool installed on the target user side is updated with the calculated parameter.

8. The method of claim 1, wherein:

on the manufacturer side, a temperature at the measurement point and a thermal displacement amount between a workpiece and a tool obtained in uniquely operating a machine tool of the same type on the manufacturer side are also measured, and the parameter is calculated by machine learning based on the measured temperature and thermal displacement amount in the unique operational status on the manufacturer side and the temperature and thermal displacement amount in the operational status on the user side; and the parameter in the machine tool installed on the target user side is updated with the calculated parameter.

* * * * *